United States Patent [19]

Kita

[11] Patent Number: 5,028,012

[45] Date of Patent: Jul. 2, 1991

[54] MAGNETIC TAPE WINDER

[75] Inventor: Akihisa Kita, Kanagawa, Japan

[73] Assignee: Fuji Photo Film Co., Ltd., Kanagwa, Japan

[21] Appl. No.: 363,008

[22] Filed: Jun. 8, 1989

[30] Foreign Application Priority Data

Jun. 8, 1988 [JP] Japan .................. 63-139346

[51] Int. Cl.$^5$ .............. B65H 18/26; G11B 5/84
[52] U.S. Cl. .................. 242/76; 242/67.10 R
[58] Field of Search ........... 242/76, 78, 78.1, 179, 242/186, 67.1 R; 226/93, 94, 96; 360/66, 90, 93

[56] References Cited

U.S. PATENT DOCUMENTS 4,909,455  3/1990  Sakaguchi et al. ............ 242/76 X

*Primary Examiner*—Daniel P. Stodola
*Assistant Examiner*—Paul Bowen
*Attorney, Agent, or Firm*—Sughrue, Mion, Zinn, Macpeak & Seas

[57] ABSTRACT

A magnetic tape winding apparatus in which the tape can be neatly wound with the use of a magnetic assembly of minimum size. The magnetic assembly is composed of a plurality of mutually concentric magnets having alternating magnetic poles disposed adjacent the side edge of the tape being wound. The magnetic assembly may be disposed around the winding shaft used to drive the tape winding body on which the tape is being wound, or it may be placed on the opposite side of the tape winding body from the winding shaft.

11 Claims, 10 Drawing Sheets

MAGNETIC TAPE WINDER

BACKGROUND OF THE INVENTION

The present invention relates to a magnetic tape winder for winding a magnetic tape through a prescribed length onto a smaller-diameter tape winding member from a supply source of magnetic tape of final product width, rewinding a magnetic tape from a tape winding member onto another tape winding member, winding a magnetic tape of larger width than the magnetic tape of the source, or winding a plurality of magnetic tapes of the final product width after the tapes have been severed from a magnetic tape whose width is larger than the final product width.

A conventional process of manufacturing a magnetic tape such as an audio cassette tape, a video cassette tape, a memory tape or a broadcasting-quality video tape generally includes a step in which a magnetic tape of prescribed length is wound onto a smaller-diameter tape winding member such as a reel and a hub from a magnetic tape source containing a long magnetic tape, a step in which the magnetic tape wound on the tape winding member is rewound therefrom onto another tape winding member, a step in which a magnetic tape of larger width than the final product width is wound onto a source reel after being severed into tapes of the final product width, or a step in which a plurality of magnetic tapes each having a final product width are wound after they have been severed from a source tape whose width is larger than the final product width.

When the magnetic tape is wound onto the tape winding member in the tape winding step or the tape rewinding step, tape behavior such as vibration of the tape in the direction of the thickness thereof and vibration of the tape in the direction of width thereof tends to change in response to changes in the physical properties of the tape or those of the tape winding member so that the side edges of the magnetic tape wound on the winding member are not aligned. As a result, the appearance of the tape wound on the member is not good. This tendency becomes more pronounced as the speed of the tape being wound on the tape winding member increases. Not only is the appearance of the final product magnetic tape poor, but also the tape is likely to have improper winding characteristics or suffer damage at the side edge of the tape, thereby causing it to develop various problems such as deterioration of the electromagnetic conversion properties of the tape. If the magnetic tape is a video tape for high-density recording, in particular, the above-mentioned tendency is a very serious problem because an audio signal and a carrier signal are recorded on the tape near the side edges thereof.

For these reasons, the appearance of the magnetic tape wound in the tape winding step or the tape rewinding step has conventionally had to be inspected manually. However, such inspection is costly and time consuming, and therefore represents a significant problem.

Conventional "neat" winding mechanisms, as shown in FIGS. 13 and 14, have been employed to reduce the burden of inspection. FIGS. 13 and 14 show a magnetic tape, a tape winding member 2, and other elements in the vicinity thereof. In the conventional neat winding mechanism shown in FIG. 13, an endless flexible belt 11 made of rubber, polyimide or the like and revolvably supported by rollers 12, 13 and 14 is passed along the magnetic tape T to elastically push the magnetic side of the tape in the radial direction of the tape winding member 2 relatively strongly to make the appearance of the wound tape neat. In the other conventional neat winding mechanism shown in FIG. 14, a belt 15 made of a relatively soft nonwoven fabric or the like and laid between one flange of the tape winding member 2 and one side edge of the magnetic tape T is wound at a constant slow speed from a belt unwinding member 16 to a belt winding member 18 while being supported by a roller 17 so as to push the side edge of the tape relatively strongly to make the appearance of the wound tape good. However, since each of the belts 11 and 15 is in direct contact with the magnetic tape T, various problems such as the magnetic layer of the tape being scraped off or fibers of the nonwoven fabric adhering to the tape can cause dropout in the recorded signal on the tape. Also, an inappropriate pushing force acts on the tape causing it to deform or causing damage to the side edges, thus effectively making it impossible to use the mechanisms to wind the tape neatly and properly.

Moreover, because the mechanisms tend to wear quickly, they are disadvantageous with respect to cost and maintenance. Furthermore, since the mechanisms must be constructed so as to allow the tape winding member 2 to move between at least a working position and a nonworking position to allow belt replacement and changing of the tape winding member, the mechanisms are complicated and the replacement of the tape winding member is so time consuming as to hinder improvement of productivity.

Presently, two different cassette tape winding systems are in general use. One of them is a so-called open winding system in which a magnetic tape is wound by one of the conventional neat winding mechanisms and thereafter put in a cassette to constitute a finished product. In the other of the systems, termed an in-cassette winding system, a C-0 winding system or a V-0 winding system, a magnetic tape is wound at the last stage of assembly of the cassette. In the in-cassette winding system, as shown in FIGS. 15 and 16, components except the magnetic tape T are assembled in the body of the cassette 23, tape winding members 2 and 3 coupled to each other by a leader tape 10 are put in a tape winding position and a tape unwinding position, respectively, in the body of the cassette, screws are tightened to form an almost-completed final product (which is referred to as a V-0 or a C-0), the leader tape is pulled out and cut off by an in-cassette winder, the leading edge of the magnetic tape to be wound in the cassette body is joined to the cut-off end of one of the two portions of the leader tape, the cut-off end of the other of the leader tape portions is suction-held by a holder 22, the tape winding member 2 having the cut-off leader tape portion joined to the leading edge of the magnetic tape is rotated to wind the magnetic tape through a prescribed length of the winding member, the magnetic tape is thereafter cut off, and the cut-off trailing edge of the wound tape is joined to the cut-off edge of the other leader tape portion to thereby complete the final product.

In the in-cassette winding system, it is impossible to put a neat winding member in contact with the magnetic tape near the tape winding member as in each of the above-described conventional neat winding mechanisms. For that reason, the wound state of the magnetic tape depends on the physical properties thereof and the dimensional accuracies of the various components of the cassette. Thus, the wound state cannot easily be controlled. As a result, the ratio of the number of neatly wound magnetic tapes to that of unneatly wound magnetic tapes is low. In order to improve the wound state of the magnetic tape, it has been attempted to provide a roller 24 having an upper end and a lower flanges 25 at the inlet opening of the cassette to apply a force to the magnetic tape in the direction of the width thereof to push the tape toward one side of the cassette. However, if the pushing force is strong, the side edge of the magnetic tape is likely to be damaged by the flange 25 of the roller 24. If the force is weak, the wound state of the tape will be little improved.

Under such circumstances, a magnetic tape winder was recently disclosed in Japanese Unexamined Published Patent Application No. 51642/86 in which, as shown in FIG. 17, a winding reel 40 is composed of a winding core 41 and a flange 42, and at least one magnet 31 is provided around a winding drive shaft 30 removably coupled to the winding core so that the flange is located between the magnetic and the magnetic tape T being wound onto the reel.

Other previously disclosed magnetic tape winders have magnets 19e and 19f having magnetic poles on the tops and bottoms of the magnets, as shown in FIGS. 18 and 19.

Yet other magnetic tape winders have been proposed having a circular magnet assembly 19g, an annular magnet assembly 19h and a square magnet assembly 19i, as shown in FIGS. 20, 21 and 22, respectively. Each of the circular magnet assembly 19g and the annular magnet assembly 19h is composed of magnets radially divided from each other. The square magnet assembly 19i is composed of rectangular magnets divided from each other. The magnets of each of the magnet assemblies 19g, 19h and 19i are disposed in such a manner that the mutually adjacent magnets differ from each other in magnetic polarity. As a result, some of the lines of magnetic forces of the mutually adjacent magnets form closed loops, as shown in FIGS. 20 and 22, so that the magnetic intensity of each of the magnet assemblies is very high. However, the present applicant has found that the very high magnetic intensity of each of the magnet assemblies does not sufficiently serve to neatly wind a magnetic tape.

One of the reasons for this will now be described. FIG. 23 shows a magnetic tape T being wound under the influence of an annular magnet assembly 19h as shown in FIG. 20 composed of radially divided magnets. FIG. 24 is a sectional view of the annular magnet assembly 19h taken along a line A-A. The directions of lines i of magnetic force of the magnets are indicated by arrows. Since the lines i of magnetic force extend in the direction of width of the magnetic tape T, the force which the magnetic assembly 19h exerts on the magnetic tape within the wound portion thereof is mostly a downward tensile force acting parallel to the axis of a shaft 27, and the magnet assembly exerts no force or very little force on the tape in the direction of the thickness thereof. As a result, the frictional force acting between the wound layers of the magnetic tape T being wound is not strong enough to offset external forces such as vibration of the winding motor. For that reason, the magnetic tape T is likely to move irregularly due to such external forces so that the tape is not neatly wound in its end portion.

The other of the above-mentioned reasons will now be described. Since the magnet assembly 19h is composed of radially divided magnets, the side edge of a part of the magnetic tape T being wound is magnetized as a south pole by the north pole of one of the magnets of the assembly and attracted thereto. However, when the winding shaft or winding reel is thereafter rotated by an angle of 60°, the side edge magnetized to the south pole is rotated to the south pole of the next magnet of the assembly (assuming the assembly contains six magnets equally divided from each other as shown in FIG. 23 and the assembly is not rotated). At that time, the side edge magnetized to the south pole is repulsed by the south pole of the magnet and then remagnetized to a north pole by the same magnets. This repulsion takes place six times during one rotation of the winding shaft, thus hindering the neat winding of the magnetic tape.

Although the annular magnet assembly 19h shown in FIG. 20 has been discussed above, the same description is applicable to the circular magnet assembly 19g shown in FIG. 21.

Winding a magnetic tape under the influence of the square magnet assembly 19i will now be described. Although the lines i of magnetic force of the magnets of the square magnet assembly 19i are oriented as shown in FIG. 22, the directions of the lines on a circle having its center on the axis of the winding shaft vary from place to place, and the magnetic forces act in the direction of thickness of the magnetic tape being wound around the winding shaft also vary from place to place around the circle. For that reason, the frictional force between the wound layers of the magnetic tape in some places is not made strong enough to offset external forces.

SUMMARY OF THE INVENTION

The present invention was made in consideration of the above-described circumstances.

Accordingly, it is an object of the present invention to provide a magnetic tape winder capable of neatly winding a magnetic tape despite the irregularities in the physical properties of the tape by making the frictional force between the wound layers of the tape stronger than in a conventional magnetic tape winder so as to prevent the neatly wound tape on a tape winding member from becoming uneven.

It is another object of the present invention to provide a magnetic tape winder capable of neatly winding a magnetic tape whether the tape is wound using the in-cassette winding system, the tape is a relatively wide tape whose width is not less than that of the source tape, or the tape is wound on a flangeless winding member.

It is yet another object of the present invention to provide a magnetic tape winder which is capable of neatly winding a magnetic tape, similar to the preceding magnetic tape winders, and is reduced in cost.

In the inventive magnetic tape winders, a tape winding member is rotated so that the magnetic tape is wound thereon. The winder is characterized in that a magnetic assembly is provided which produces a magnetic field which extends through at least the tape winding member, the magnet assembly containing a plurality mutually concentric circular magnets which have their centers on the axis of rotation of the tape winding member and have mutually different magnetic poles on at least the sides of the magnets which face the side edge of the magnetic tape.

DESCRIPTION OF THE PREFERRED EMBODIMENTS

Preferred embodiments of the present invention are hereafter described with reference to the drawings attached hereto.

Figure 1:
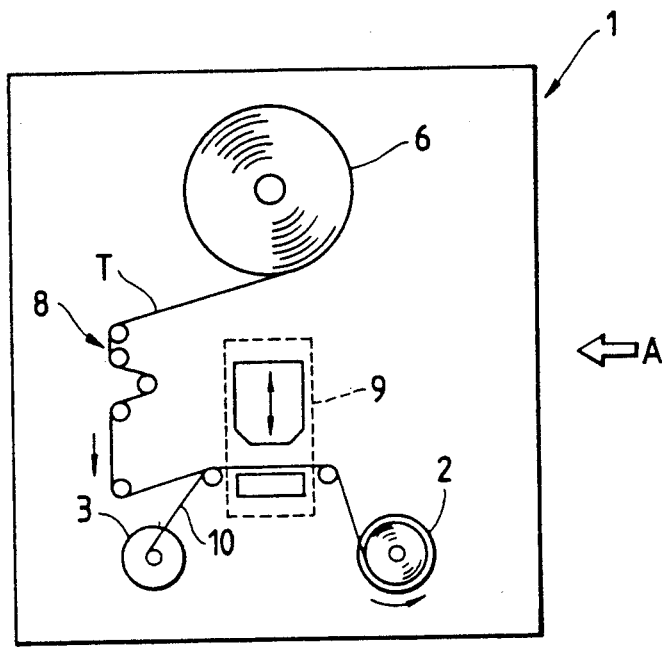
FIG. 1 is a front view of a magnetic tape winder constructed according to a preferred embodiment of the present invention.
Figure 2:
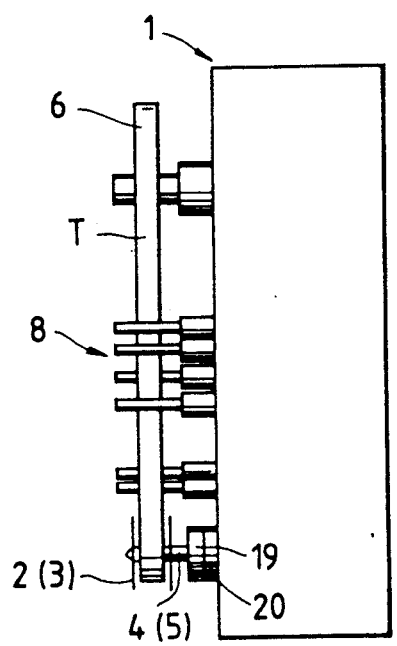
FIG. 2 is a side view of the magnetic tape winder of FIG. 1.
Figure 3:
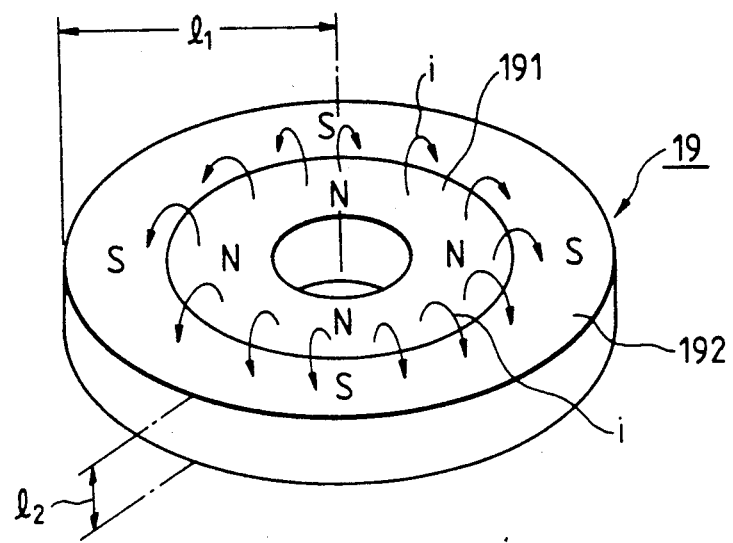
FIG. 3 is an enlarged perspective view of the magnet assembly of the magnetic tape winder of FIG. 1.

FIG. 1 is a front view of a magnetic tape winder 1 constructed according to a preferred embodiment of the invention. FIG. 2 is a side view of the magnetic tape winder 1 viewed along an arrow A shown in FIG. 1.

The winder 1 is used for the pen winding system so that a magnetic tape T is wound on one of two tape winding reels 2 and 3, which thereafter are placed in the body of a video tape cassette or the like. The reels 2 and 3 are first coupled to each other by a leader tape 10 of prescribed length and mounted on winding rotary shafts 4 and 5. The leader tape 100 is then cut at the middle part thereof. The cut-off end of the leader tape portion coupled to the winding reel 2 and the leading edge of the magnetic tape T extending from a magnetic tape source 6 are joined to each other by a splicing tape or the like. The magnetic tape T is then wound though a prescribed length onto the reel 2 and then cut off. The cut-off end of the wound tape T is joined by a splicing tape or the like to the cut-off end of the other leader tape portion coupled to the winding reel 3. The cutting and joining of the leader tape 10 and the magnetic tape T are performed by a cutting and splicing device 9 including a tape edge holder member, a cutter and a supply of splicing tape. The magnetic tape T is passed from the magnetic tape source 6 to the tape winding reel 2 through a passage mechanism 8 including guide pins and guide rollers so that the tape is wound on the reel. (FIG. 2 does not show the cutting and splicing device 9.) As for the above-described construction and operation, the magnetic tape winder 1 is the same as a conventional magnetic tape winder.

Characteristic features of the magnetic tape winder 1 of the invention will now be described.

A magnet assembly 19 composed of inner and outer annular magnetics 191 and 192 magnetically divided from each other and concentric with each other as shown in FIG. 33 is provided near the tape winding reel 2 on which the magnetic tape T is to be wound. The magnetic poles of the sides of the magnets 191 and 192 which face the side edge of the magnetic tape T being wound on the reel 2 differ from each other in magnetic polarity.

Figure 4:
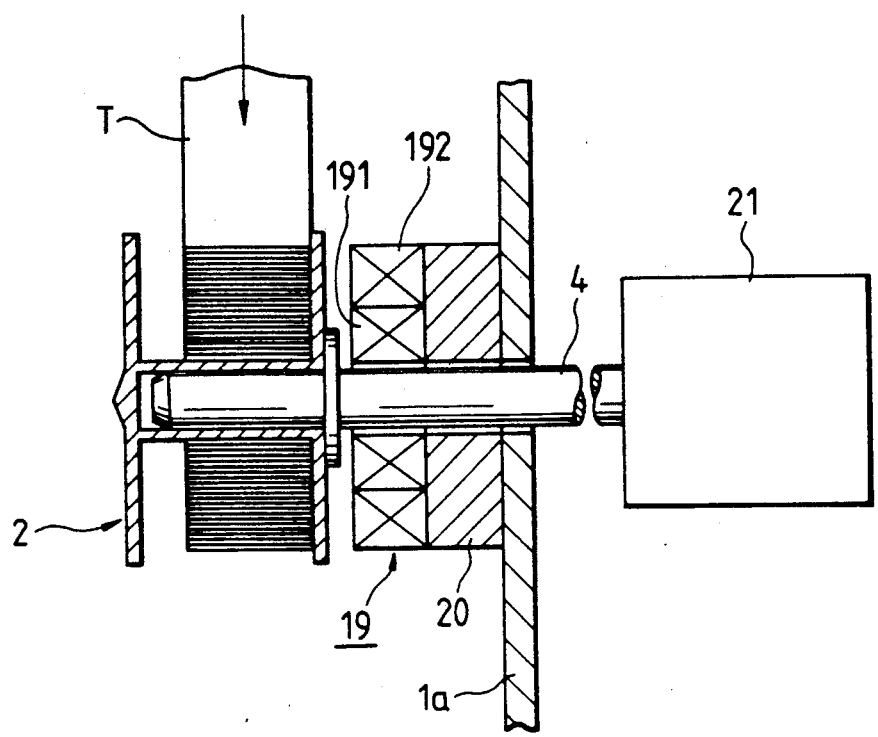
FIG. 4 is an enlarged sectional view of the magnetic tape winder of FIG. 1.

The magnet assembly 19 is a permanent magnet assembly and has a center hole. The magnet assembly 19 is attached with a support member 20 to a front panel 1a and surrounds the winding rotary shaft 4, as shown in FIG. 4. The magnetic poles of each of the inner and outer magnets 191 and 192 of the magnet assembly 19 are separated from each other in the direction of width of the magnetic tape (the axial direction of the winding rotary shaft 4). The inner and outer magnets 191 and 192 differ from each cther in magnetic polarity on their sides adjacent to each other in the radial direction of the magnetic assembly 19. The diameter 1 of the magnet assembly 19 is nearly equal to or greater than that of the tape winding reel 2. It is preferable that the diameter of the magnet assembly 19 e more than that of the tape winding reel 2.

Figure 5:
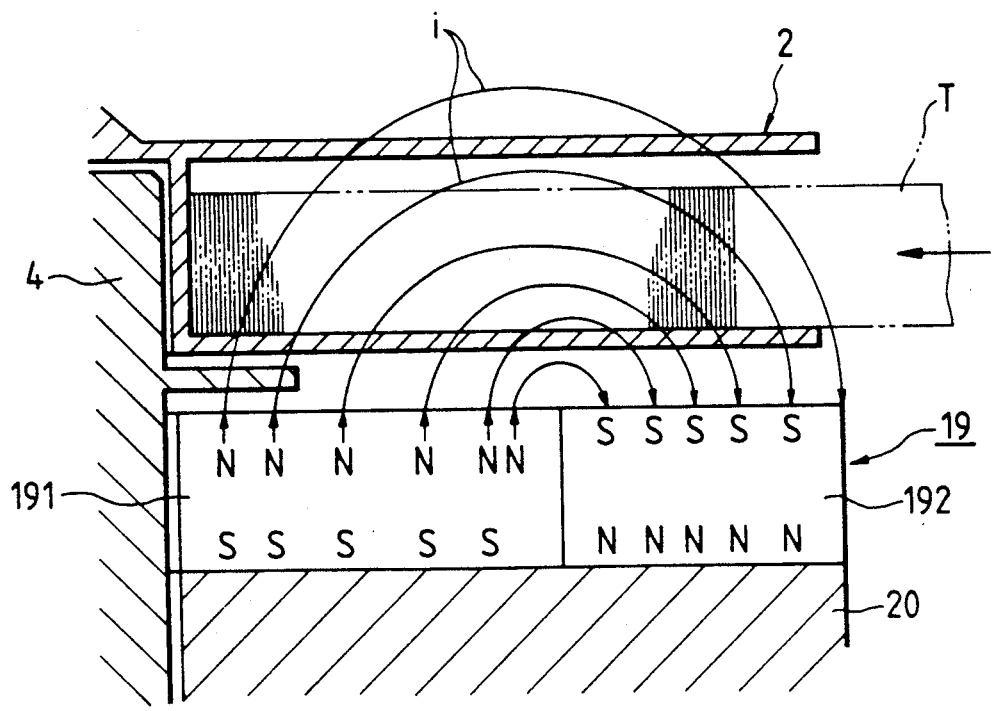
FIG. 5 is a sectional view of a major part of the magnetic tape winder of FIG. 1 and is used for describing the operation thereof.

With this arrangement, the magnetic tape T is wound on the reel 2 by the under 1 much more neatly than with the conventional magnetic tape winders shown in FIGS. 17–24. This is because the lines 1 of magnetic force, which extend from the inner magnet 191 of the magnet assembly 19 to the outer magnet 192 thereof, are oriented substantially in the radial direction of the assembly. The lines 1 of magnetic force, which extend through the magnetic tape T being wound on the reel 2, as shown in FIG. 5, act not only to pull the tape toward the magnet assembly 19 but also to pull the mutually adjacent wound layers of the tape toward each other in the direction of the thickness of the tape. Since the portions of the lines i of magnetic force which act to pull thee mutually adjacent wound layers of the tape T toward each other in the direction of thickness are uniformly distributed in the radial direction of the magnet assembly 19, the force which pulls the mutually adjacent wound layers of the tape toward each other in the direction of the thickness is not changed by the rotation of the tape winding reel 2. Hence, a stable frictional force which is strong enough to offset unwanted external forces which would otherwise move the mutually adjacent wound layers of the tape relative to each other is always present between the tape layers.

Thus, the problems of the above-described conventional magnetic assemblies composed of magnets magnetically divided form each other in the radial direction are eliminated. Some of the lines i of magnetic force, which extend through the different magnetic poles of the mutually adjacent magnets 191 and 192 facing the side edge of the magnetic tape T, form closed loops so that the magnetic force which acts on the tape T is made sufficiently strong and is effectively applied to the tape from the beginning to the end of the winding thereof. For this reason, the tape T is very neatly wound on the reel 2.

Since the magnetic force of the magnet assembly 19 is fully used to neatly wind the tape T on the reel 2, the assembly can be formed of magnets of relatively low magnetism or relatively small thickness. For that reason, the magnet assembly 19 can be reduced in size and cost in comparison with the conventional magnet assemblies.

The form and material of the support member 20 are not particularly limited. For example, the support member 20 can be made of a ferromagnetic substance such as permalloy-containing iron and nickel. If the member 20 is annularly formed as well as the magnet assembly 19, it is easier for the lines of magnetic force of the assembly to form the closed loops at both sides facing the support member and the magnetic tape T to thus intensify the magnetic force which acts on the tape. If the front panel 1a is made of a ferromagnetic substance, the same effect is produced. The magnetic force ratio of the ferromagnetic substance is $10^{-3}$ or more.

The intensity of the magnetic field of the magnet assembly 19 is not particularly limited, and may be preset in consideration of the tension of the magnetic tape T being wound on the reel 2, the type of the tape, the distance between the magnet assembly and the tape, the speed of running of the tape being wound on the reel, the amount of influence of the magnetic field upon the tape, etc.

Although the permanent magnet assembly 19 is secured in a prescribed position in the above-described embodiment, the present invention is not confined thereto and may be otherwise embodied so that the magnet assembly can be moved along the winding rotary shaft 4 to optionally change the intensity of the magnetic force which acts to the magnetic tape T. Although the magnet assembly 19 is annularly formed to face one entire side of the tape winding reel 2, the assembly may be formed in other various manners.

Although the magnetic tape winder 1 described above is used in an open winding system, the present invention is applicable to the in-cassette winding system as well.

Figure 6:
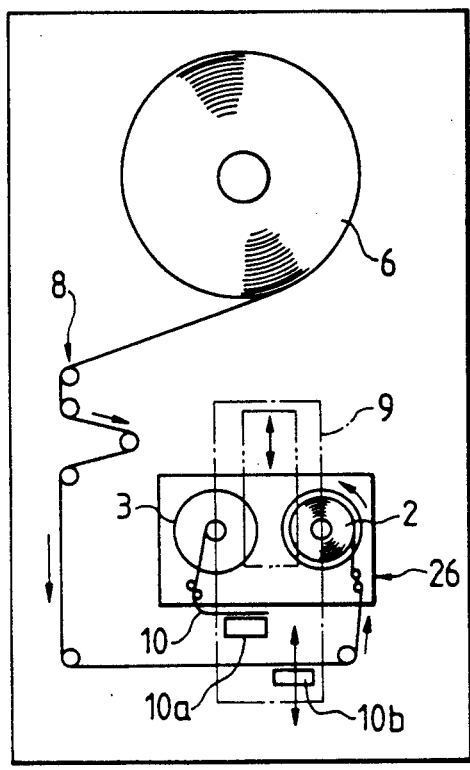
FIG. 6 is a front view of a magnetic tape winder of another embodiment of the present invention.
Figure 7:
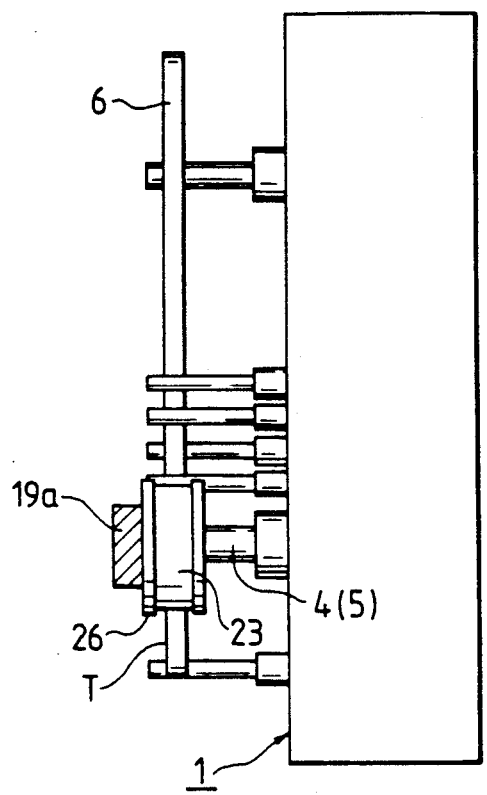
FIG. 7 is a side view of the magnetic tape winder of FIG. 6 viewed along an arrow A shown inn FIG. 6.

FIG. 6 is a front view of a magnetic tape winder 1 constructed according to another embodiment of the present invention. FIG. 7 is a side view of the magnetic tape winder 1 taken in the direction of an arrow A shown in FIG. 6. The winder 1 is used in an in-cassette winding system so that a magnetic tape T is wound on one of tape winding reels 2 and 3 after the reels are placed in the body of a VHS or Beta type video tape cassette or the like. The tape winding reels 2 and 3 are first coupled to each other by a leader tape 10 of prescribed length ad placed in the body 23 of the cassette. The cassette is then held by the cassette holder 26 of the winder 1. The cassette holder 26 is thereafter moved so that winding rotary shafts 4 and 5 are inserted into the tape winding reels 2 and 3. The leader tape 10 is cut off at the middle thereof. The cut-off end of the leader tape portion coupled to the reel 2 and the leading edge of the magnetic tape T extending from a magnetic tape source 6 are joined to each other by a splicing tape or the like. The magnetic tape T is then wound though a prescribed length on the reel 2 and cut off. The cut-off trailing edge of the wound tape T and the cut-off edge of the other leader tape portion coupled to the other reel 33 are joined to each other by a splicing tape or the like. The cutting and splicing of the leader tape 10 and the magnetic tape T are performed by a cutting and splicing device 9 including tape end holding members 10a and 10b, a cutter and a supply of the splicing tape. The magnetic tape T is passed from the magnetic tape source 6 to the tape winding reel 2 through a passage mechanism 8 including guide pins and guide rolls so that the tape is wound on the reel. (FIG. 7 does not show the cutting and splicing device 9.)

Figure 8:
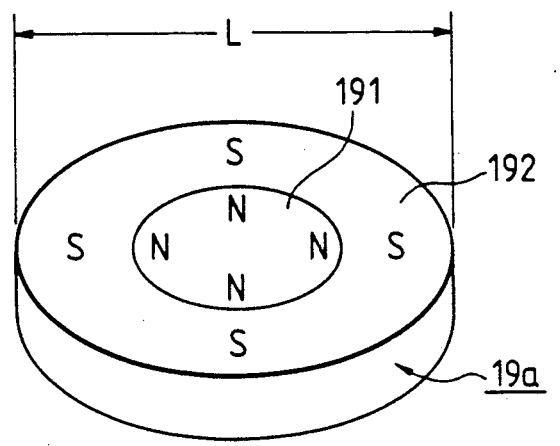
FIG. 8 is an enlarged perspective view of the magnet assembly of the magnetic tape winder shown in FIG. 6.
Figure 9:
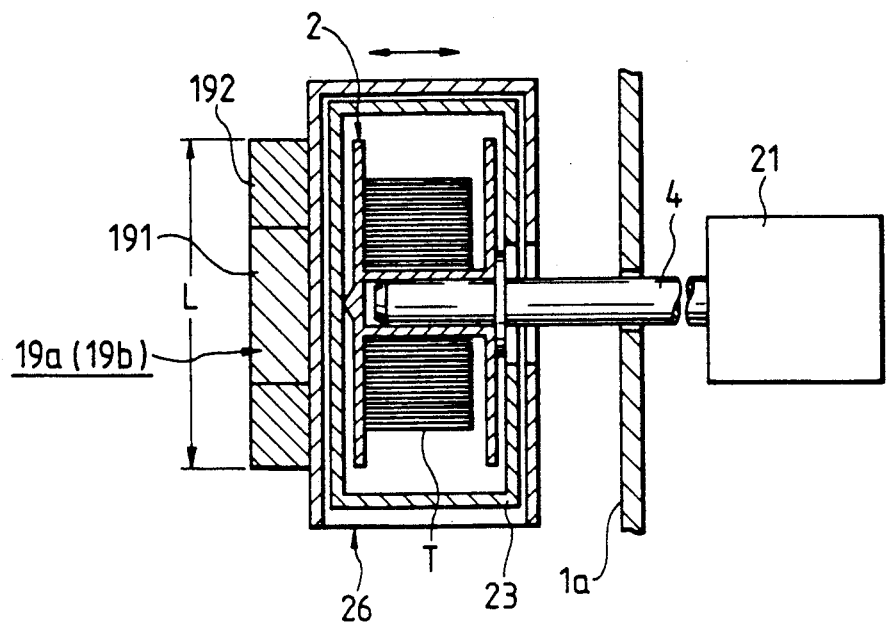
FIG. 9 is an enlarged sectional view of the magnetic tape winder shown in FIG. 6.

The characteristic features of the magnetic tape winder 1 shown in FIGS. 6 and 7 will now be described. A permanent magnet assembly 19a is provided on the cassette holder 26 so that the assembly is located near the tape winding reel 2 coaxially with the winding rotary shaft 4 coupled to a drive motor 21 or the like, as shown in FIG. 9. The magnet assembly 19a, which is shaped like a disk, is composed of inner and outer magnets 191 and 192, respectively, divided from each other and concentric with each other, as shown in FIG. 8. The magnetic poles of the sides of the inner and the outer magnets 191 and 192 which face the side edge of the magnetic tape T being wound on the reel 2 differ from each other in magnetic polarity. The diameter of the magnetic assembly 19a is larger than that of the completely wound magnetic tape T on the reel 2. The magnetic poles of the mutually adjacent outside surfaces of the inner and outer magnets 191 and 192 of the magnet assembly 19a differ from each other in magnetic polarity.

The cassette holder 26 is shaped like a box. The permanent magnet assembly 19a is attached to the side plate of the holder 26 coaxially with the winding rotary shaft 4. The holder 26 is supported by a member not shown in the drawings.

When the magnetic tape T is wound by the winder 1 shown in FIGS. 6-14 9, the tape is magnetically attracted by the magnet assembly 19a so that the tape is pulled against one flange of the tape winding reel 2. Since the side surface of the magnet assembly 19a located near the reel 2 is constituted by the mutually concentric inner and outer magnets 191 and 192 having mutually different magnetic poles, in the same manner as the embodiment shown in FIGS. 1-5, some of the lines of magnetic force of the magnet assembly form closed loops extending through the magnetic tape T in the radial direction of the wound tape, so that an intense magnetic field acts on the tape. Since the closed loops extend through the magnetic tape T in the direction of thickness thereof, the e frictional force between the wound layers of the tape is made stronger by the winder 1 than inn the above-described conventional winders, thus preventing the neatly wound tape from being disordered. Since the magnet assembly 19a has no center hole, the direction of the magnetic field and the density of the magnetic flux thereof are stable at the central portion of the tape winding reel 2 as well as at the peripheral portion thereof. Thus, a strong magnetic field acts on the tape T from the beginning to the end of the winding operation, namely, from the central portion of the reel to the peripheral portion thereof. As a result, not only are the side edges of the wound layers of the magnetic tape T well trued up, but also the wound layers are put in tight contact with each other. Although the behavior of the magnetic tape T at the beginning of the winding thereof may be unstable, the tape is neatly wound due to the intense magnetic field of the magnet assembly 19a.

Although the permanent magnet assembly 19a is secured in a prescribed position, the assembly may be moved along the winding rotary shaft 4 to optionally alter the intensity of the magnetic attraction force which acts to the magnetic tape T. Although the diameter L of the magnet assembly 19a is nearly equal to or more than that of the flange of the tape winding reel 2, the assembly may have any size and form as long as the magnetic field thereof is strong enough and surely acts on the magnetic tape T from the beginning to the end of the winding operation.

Figure 10:
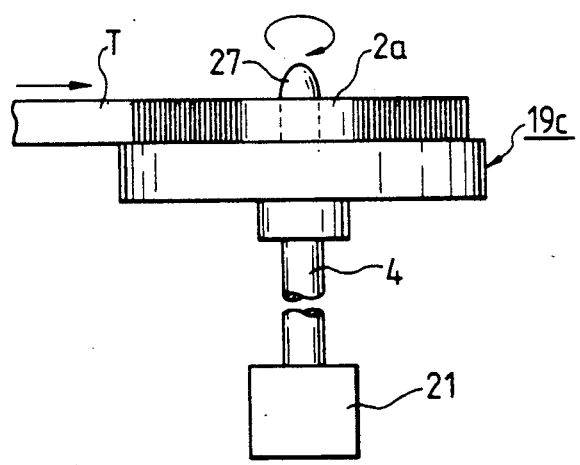
FIG. 10 is a side view of a major part of a magnetic tape winder of yet another embodiment of the present invention and which has a flangeless winding core.

Moreover, although the tape winding reel 2 in each of the above-described embodiments has flanges, the present invention may be otherwise embodied so that a magnetic tape T is wound on a tape winding core 2a having no flange, as shown in FIG. 10. In the embodiment shown in FIG. 10, the permanent magnet assembly 19c is composed of inner and an outer magnets concentric with each other with magnetic poles on the mutually adjacent outside surfaces of the magnets. A shaft 27 is engaged in the tape winding core 2a and projects from the center of the magnet assembly 19c. The shaft 27 can be made of either a magnetic or nonmagnetic substance. The side of the magnet assembly 19c which faces the tape T serves as a flange on which the side edge of the tape is placed when it is wound on the core 2a. Since the magnetic tape winder shown in FIG. 10 operates in the same manner as the preceding embodiment and the side edge of the magnetic tape T is in contact with the magnet assembly 19c, the tape is much more neatly wound on the flangeless winding core 2a than in conventional magnetic tape winders with flangeless winding members.

Figure 11:
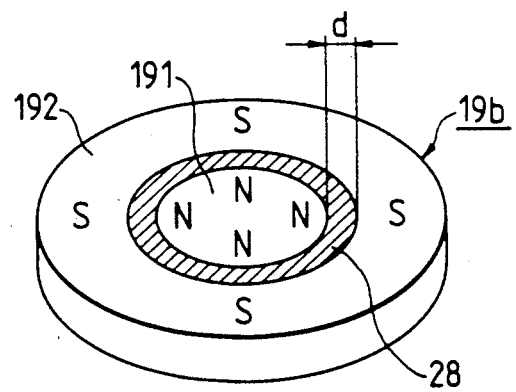
FIGS. 11 and 12 are perspective views of the magnet assemblies of magnetic tape winders of yet other embodiments of the present invention.
Figure 12:
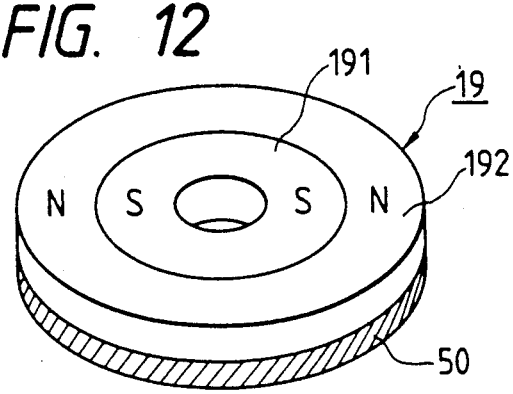
Figure 13:
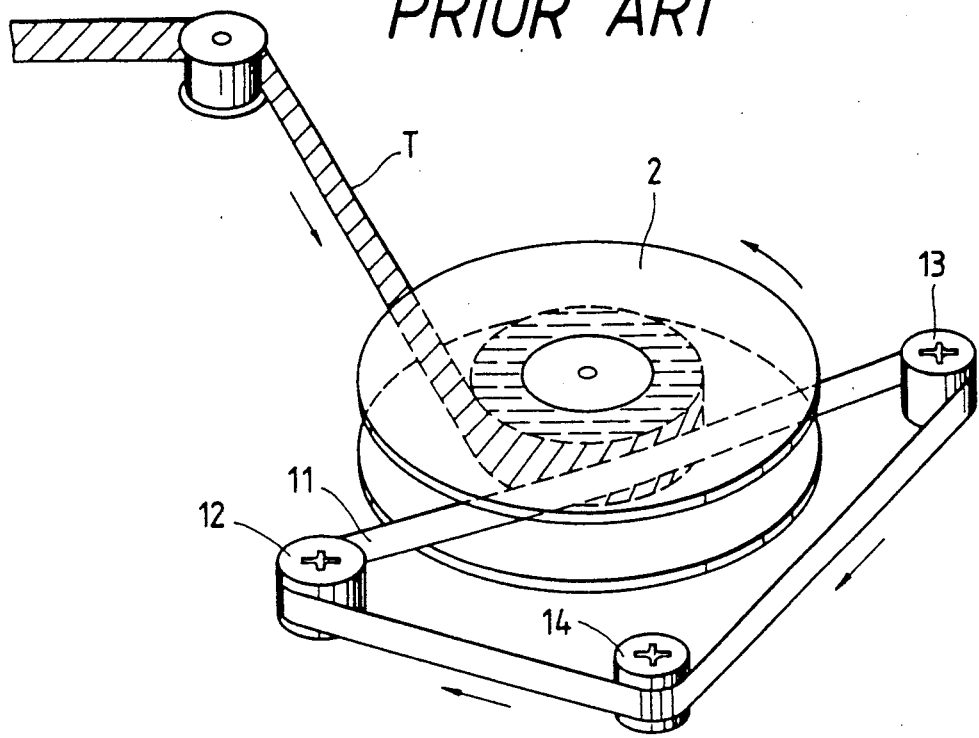
FIGS. 13 and 14 are partial perspective views of conventional magnetic tape winders.
Figure 14:
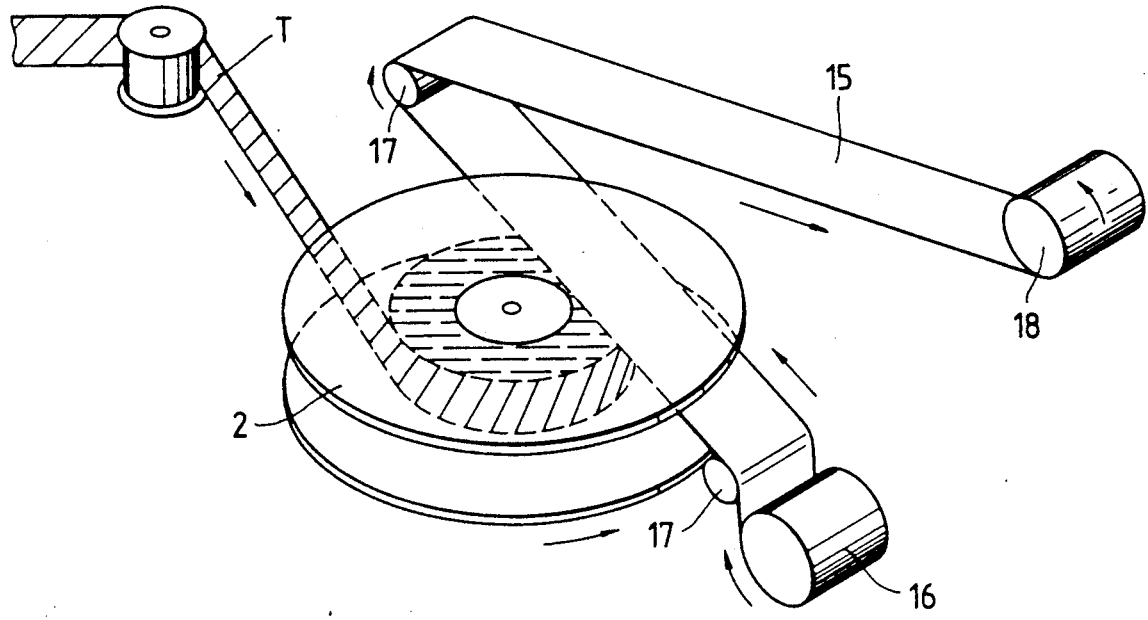
Figure 15:
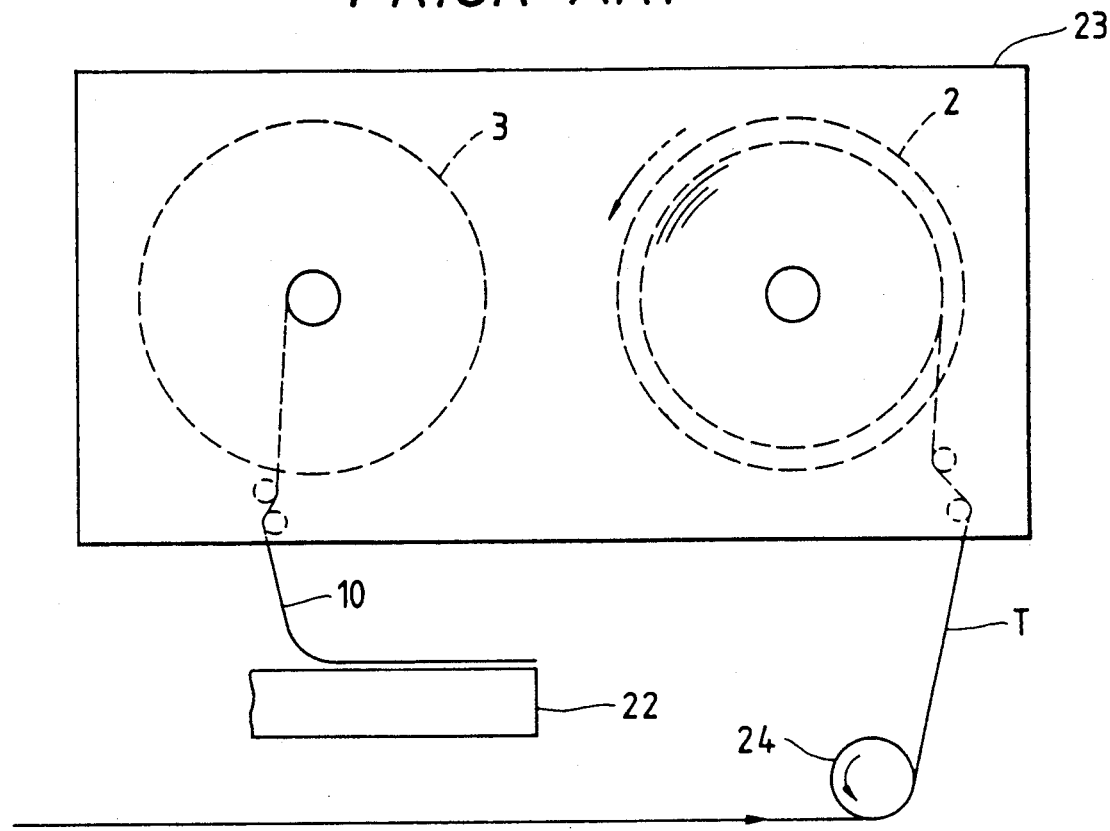
FIG. 15 is a plan view of a conventional magnetic tape winder used n an in-cassette winding system.
Figure 16:
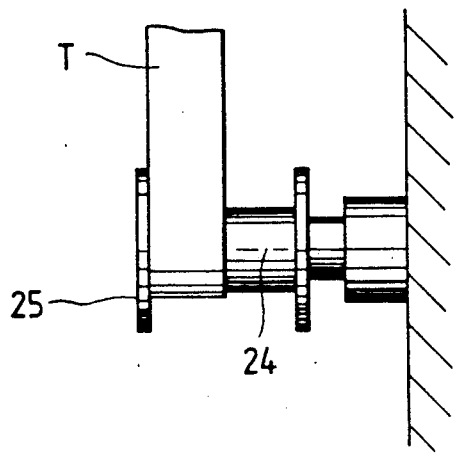
FIG. 16 is an enlarged side view of a major part of the conventional magnetic tape winder shown inn FIG. 15.
Figure 17:
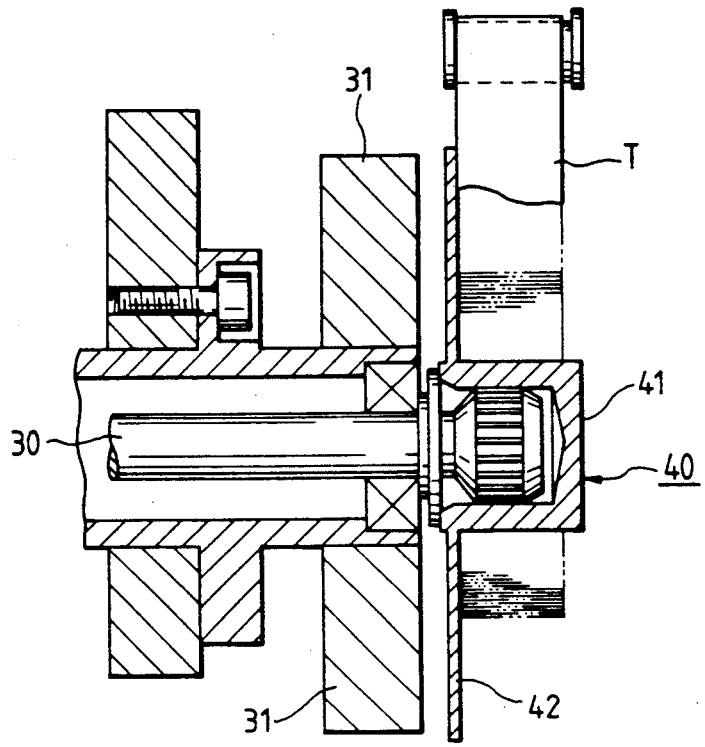
FIG. 17 is a partial sectional view of another conventional magnetic tape winder.
Figure 18:
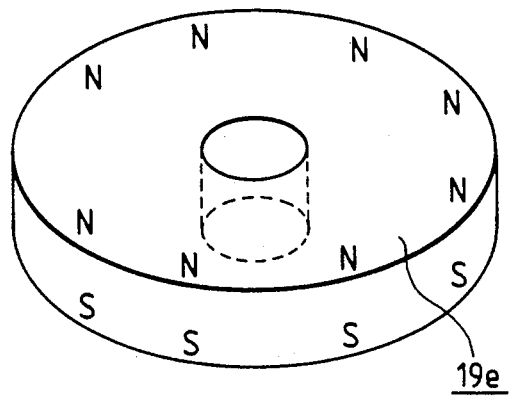
FIG. 18, 19, 20, 21 and 22 are perspective views of conventional magnetic assemblies.
Figure 19:
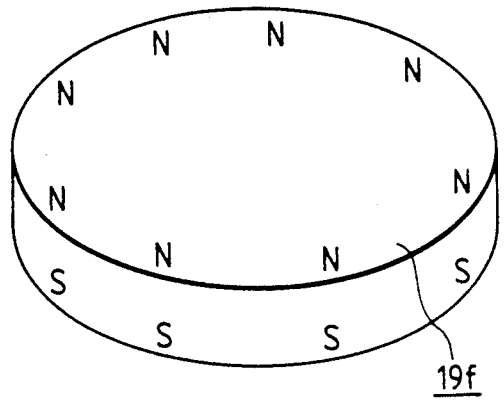
Figure 20:
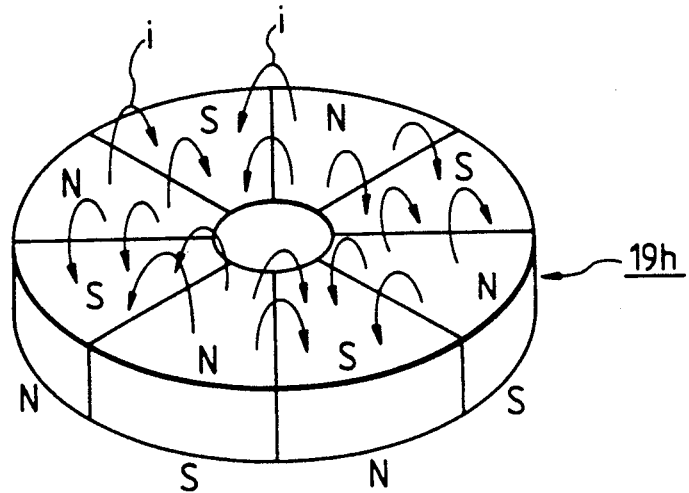
Figure 21:
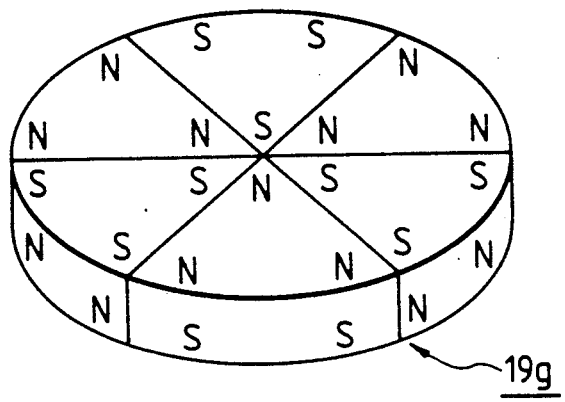
Figure 22:
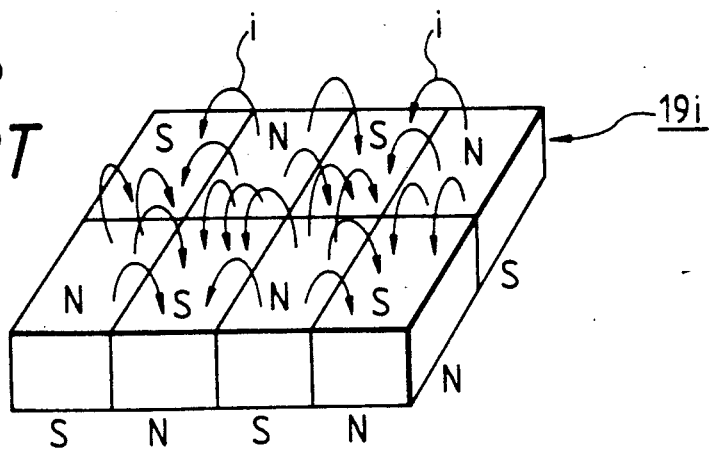
Figure 23:
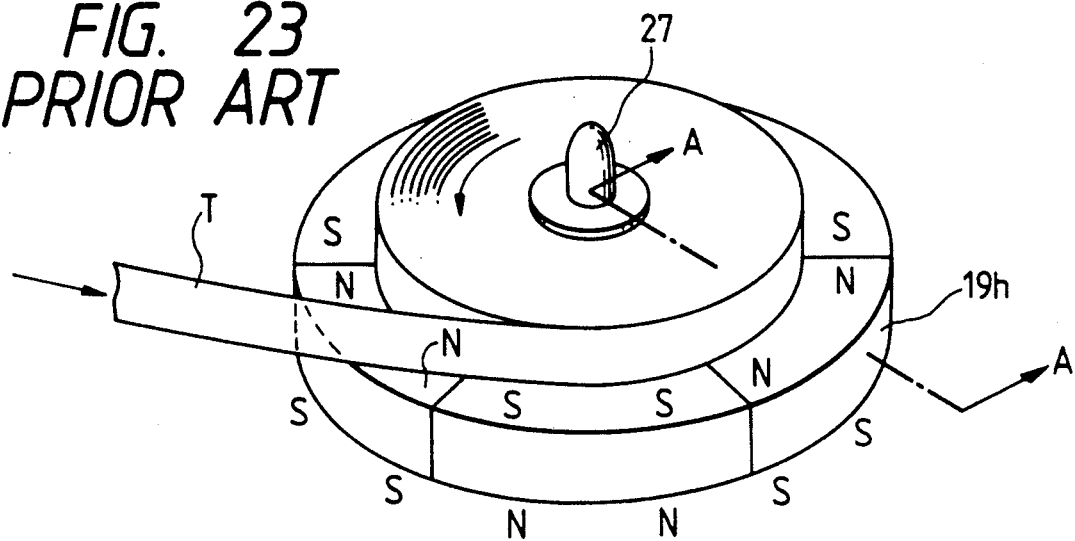
FIG. 23 is a perspective view of yet another conventional magnetic tap winder.
Figure 24:
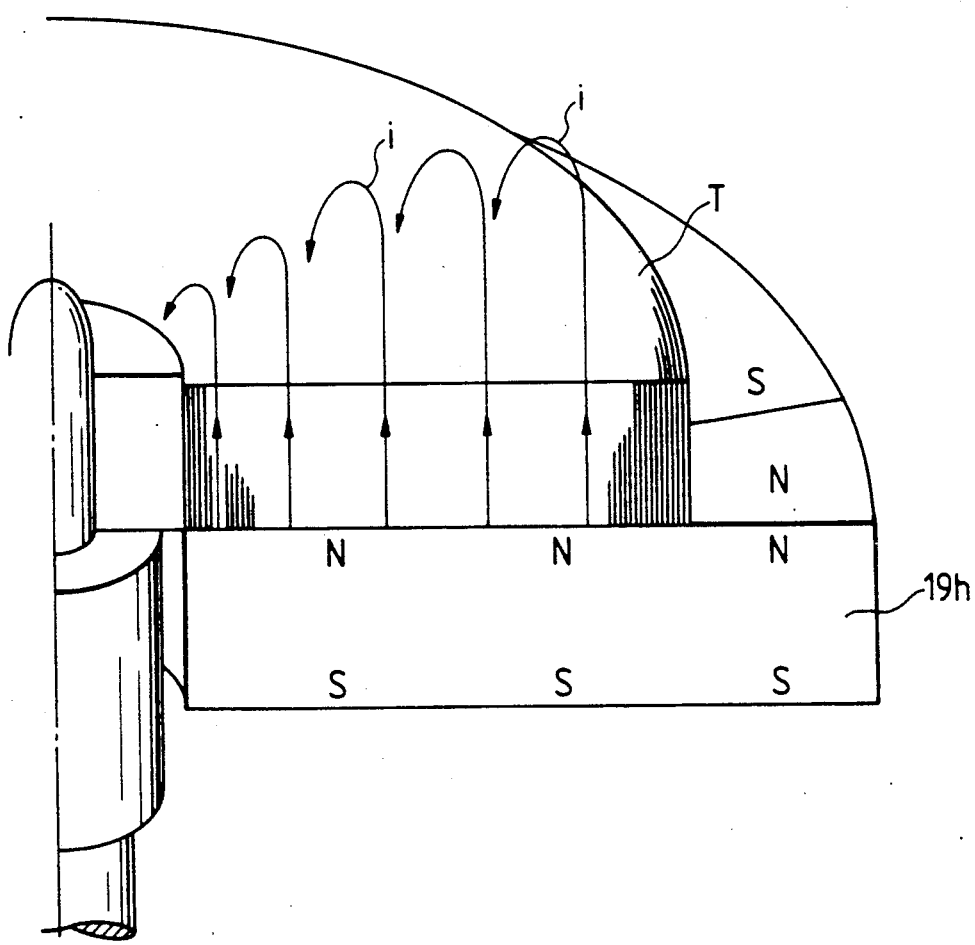
FIG. 24 is a perspective sectional view of the conventional magnetic tape winder of FIG. 23 taken along a line A—A in FIG. 23.

Still further, although the mutually adjacent magnets 191 and 192 of each of the permanent magnet assemblies 19, 19a and 19c in the above-described embodiments are in contact with each other, the present invention may be otherwise embodied so that a separator 28 made of a nonmagnetic substance is provided between the magnets of a permanent magnet assembly, as shown in FIG. 11. The width d of the separator 28 can be appropriately preset depending on the distance between the magnetic tape T and the magnet assembly to optimize the intensity of a magnetic field which acts to the tape. The present invention may be yet otherwise embodied so that ann annular or circular plate 50 made of a magnetic substance is provided on the reverse side of a permanent magnet assembly 19, as shown in FIG. 12, to intensify the magnetic field which acts on the magnetic tape.

Notwithstanding the fact that the magnet assembly is provided only at the winding rotary shaft 4 in each of the above-described embodiments, the present invention may be otherwise embodied so that a magnet assembly is appropriately provided at the passage mechanism 8 so as to apply a magnetic force to the magnetic tape T in the direction of the width thereof to suppress swinging or vibration of the tape in that direction and to further stabilize the running of the tape.

Each of the permanent magnet assemblies 19, 19a, 19b and 19c is composed of the two magnets 191 and 192 and has a circular shape in the above--discussed examples of the invention, but each of the assemblies may be composed of more than two magnets and have a noncircular shape.

Although each of the assemblies 19, 19a, 19b and 19c are formed of permanent magnets, the present invention may be otherwise embodied so that the magnet assembly is formed by electromagnets. The intensity of each of the electrical currents driving the electromagnets can be changed to alter the magnetic forces thereof optionally.

Figure 25:
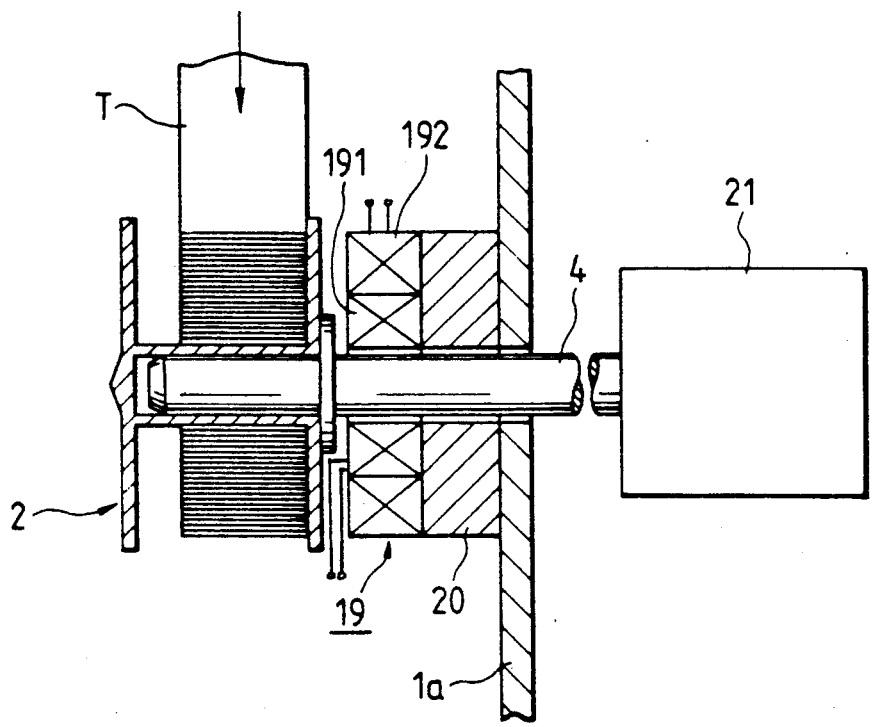
FIG. 25 is a view similar to FIG. 4 showing an alternate embodiment of the invention.

The magnets 191 and 192 need not necessarily be a permanent magnet, for instance, they may be a magnetic field generator such as an electromagnet 191 and 192, as shown in FIG. 25, or a solenoid which does not generate a magnetic field of high intensity.

The present invention is not confined to the above-described embodiments, and the invention can also be applied to the case where a plurality of magnetic tapes each having a final product width are wound while they are severed from a source tape whose width is larger than the final product width.

According to the present invention, the magnet assembly of the magnetic tape winder is composed of magnets which are disposed concentrically with respect to each other and have mutually different magnetic poles on at least the sides of the magnets which face the magnetic tape being wound on a reel so that some of the lines of magnetic force of the assembly form closed loops uniformly distributed in the radial direction of the wound magnetic tape. As a result, the intensity of the magnetic field which acts on the magnetic tape being wound on the reel is uniformly increased throughout the diameter of the completely wound tape on the reel so as to neatly wind the tape on the reel. Also, the magnetic force which attracts the wound layers of the magnetic tape to each other in the direction of thickness of the tape is made strong enough to supply a stable high frictional force between the wound layers to surely prevent the layers from becoming disordered after the tape has once been neatly wound. For these reasons, the magnet assembly can produce a magnetic effect equal to or higher than that produced by a conventional magnet assembly, even if the size or magnetic force of the former magnet assembly is smaller than that of the conventional magnet assembly. Therefore, the inventive magnet assembly can be mounted in a small space around the winding rotary shaft while yet providing a sufficient magnetic force to the magnetic tape. Furthermore, the side edge of the magnetic tape is neatly wound by the winder so that the side edges of the wound layers of the tape are trued up. In addition, the productivity in the winding of the tape by the winder is improved. Particularly if the winder is used to wind tape in the in-cassette winding system or to wind tape on a flangeless winding member, the winder produces a much better effect than a conventional winder.

What is claimed is:

1. A magnetic tape winder comprising:
 a tape winding body for receiving a magnetic tape to be wound;
 means for rotating said tape winding body to wind said magnetic tape on said tape winding body; and
 a magnetic assembly provided adjacent said tape winding body, said magnetic assembly comprising a plurality of annular mutually concentric magnets having centers on a center of rotation of said tape winding body and mutually different magnetic poles facing a side of said tape wound on said tape winding body.

2. The magnetic tape winder of claim 1, wherein a diameter of said magnetic assembly is substantially the same as a diameter of said tape winding body.

3. The magnetic tape winder of claim 1, wherein said means for rotating said tape winding body comprises a rotary shaft, an inner one of said concentric magnets having a hole at a center thereof through which said rotary shaft passes.

4. The magnetic tape winder of claim 3, wherein said magnetic assembly is movably mounted along said rotary shaft.

5. The magnetic tape under of claim 1, wherein said means for rotating said tape winding body comprises a rotary shaft, and wherein said magnetic assembly is mounted on a side of said tape winding body opposite said rotary shaft, an inner one of said concentric magnets having the shape of a disc.

6. The magnetic tape winder of claim 1, further comprising ing a nonmagnetic spacer inserted between at least two of said concentric magnets.

7. The magnetic tape winder of claim 1, further comprising a plate of a magnetic material disposed on a side of said magnetic assembly opposite said tape winding body.

8. The magnetic tape winder of claim 1, further comprising a second magnetic assembly for applying a magnetic field to said tape in a direction of width of said tape.

9. The magnetic tape winder of claim 1, wherein each of said concentric magnets has a circular outer shape.

10. The magnetic tape winder of claim 1, wherein each of said concentric magnets is a permanent magnet.

11. The magnetic tape winder of claim 1, wherein each of said concentric magnets is an electromagnet.

* * * * *